Patented June 26, 1934

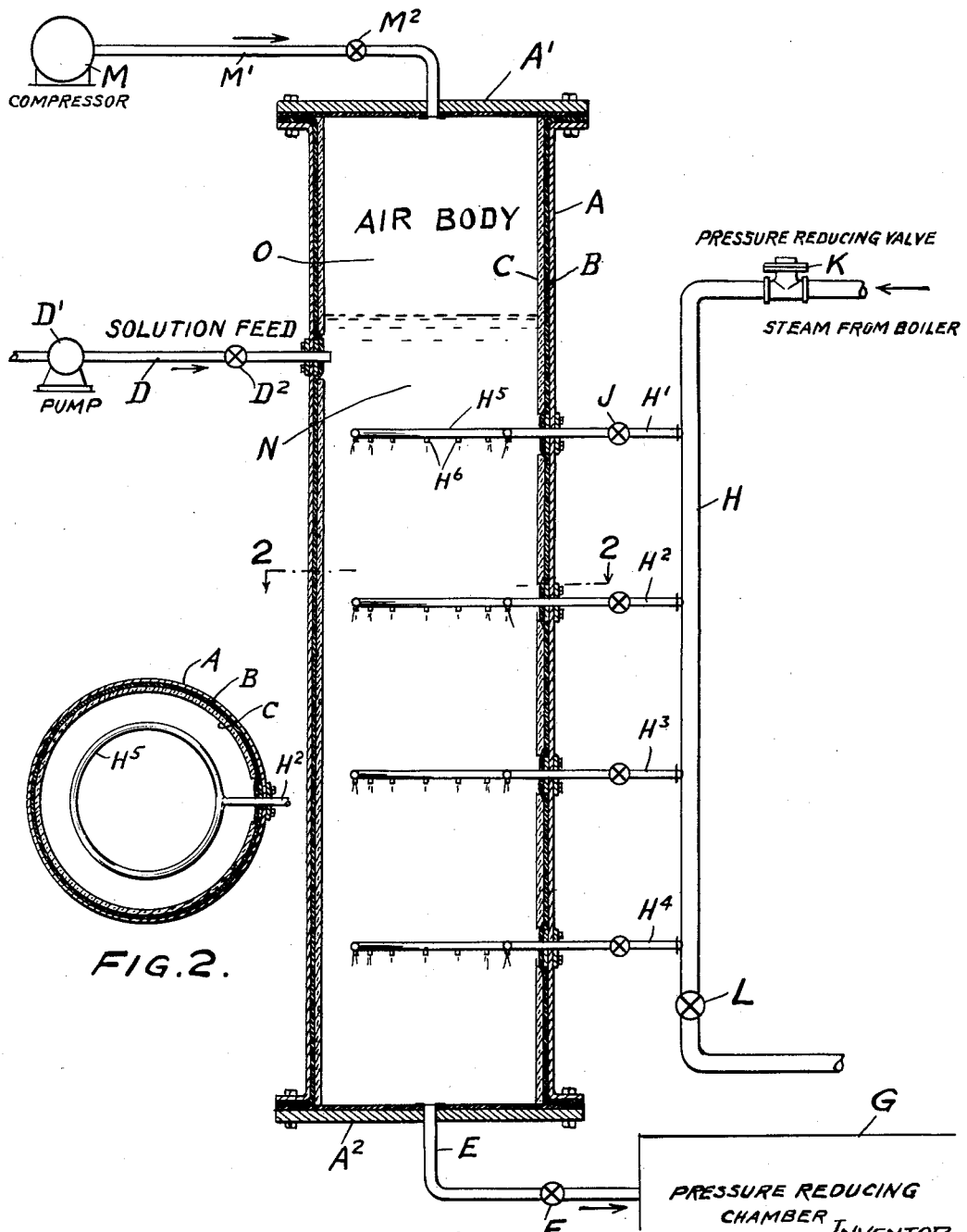

1,964,389

UNITED STATES PATENT OFFICE 1,964,389

METHOD OF MANUFACTURING BASIC ALUM

Gordon R. Steuart, deceased, late of Denver, Colo., by Katherine Steuart, administratrix, Denver, Colo., assignor, by mesne assignments, to Kalunite Company, a corporation of Delaware Application April 22, 1932, Serial No. 606,786

6 Claims. (Cl. 23—118)

My invention relates to the manufacture of basic alum by a process in which a solution of a normal alum is subjected to temperatures in excess of 140° C. and at corresponding pressures with the result of forming and precipitating in a finely divided state a basic alum and forming a solution of sulphuric acid and alkali and/or ammonium sulphate which has been eliminated from the normal alum. As examples of normal alums, I would mention:

where X represents potassium, sodium or ammonium, and as examples of what I have referred to as basic alums I will mention the compound:

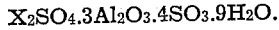

in which X represents potassium, sodium or ammonium.

By basic alum I mean a hydrated compound of an alkali and/or ammonium sulphate, and basic aluminum sulphate.

This process is advantageously carried out at a temperature of approximately 200° C. and cannot be advantageously practiced at temperatures below 140° C. It is also known that where the solutions under treatment consist only of a normal alum solution that only about 80% of the alumina present in the normal alum is to be found in the basic alum precipitate and that by incorporating in the solution additional alkali sulphate to the extent of an amount equal to that present in the normal alum a basic alum can be formed embodying about 98% of the alumina present in the normal alum solution. So far as I am aware the above outlined process of manufacturing a basic alum has not been commercially availed of, probably for the reason that no commercially available method has been devised for its practice. In view of the high pressures incident to the high temperature to which I desire to raise the solution, it is of course necessary that the container in which the alum solution is treated should be capable of withstanding such pressures and in view of the sulphuric acid eliminated in the process and contained in the mother liquor from which the basic alum is precipitated it is necessary that the container should be of such a character as to be non-reactive with the acid. This would involve practically the lining of a steel container with material non-reactive with the acid in the solution and I have found that the best practical construction of such a container is the lining of a steel outer body with lead, but I have found that where the container is externally heated a portion of the basic alum precipitated from the solution has a tendency to adhere to the lining in the form of a strongly adherent scale which greatly impairs the conductivity of the container wall so that the temperature of the lead lining may be raised to such a point that it might even reach the melting point. The conductivity of the composite container is, even under normal conditions, low and with the additional resistance afforded by the deposited scale it would become much lower, these conditions naturally interfering with the proper heating of the solution and also involving such elevation in temperature of the steel outer member of the container as to be dangerous.

The object of my invention is to provide a method for rapidly heating the alum solution to the necessary temperature for the prompt and effective precipitation of the basic alum, to regulate the heating of the solution in such manner as will bring about the precipitation of the basic alum in a desired particle size, and, finally, to provide for the heating of the alum solution in a continuous process by which the basic alum is precipitated therefrom as it is passed in a continuous stream through the container. Broadly speaking, my invention consists in enclosing the alum solution in a strong container lined with non-reactive material and raising its temperature to the desired point by injecting into the solution contained in the container high pressure steam at a sufficient temperature and in sufficient quantity to promptly raise the temperature of the solution to an efficient reactive point in excess of 140° C. I have found that under such conditions it is possible to raise the temperature of the solution to the necessary or desired point promptly and with the result that the basic alum is precipitated therefrom without tendency to adhere to any injurious degree to the walls of the container, although by my method of heating the solution by the introduction of high pressure steam, an adhering scale of moderate thickness would not be injurious and might even be of some advantage in that it would decrease the rate of heat conduction through the walls of the container and that by regulating the heating of the solution by a regulated admission of steam that it is possible to control within certain limits, the particle size of the precipitate. Thus, generally speaking, the more gradually the temperature of the solution is raised the larger will be the particle size of the precipitate, while with a more rapid heating it is possible and practical to produce the basic alum in the form of an exceedingly fine precipitate and it is also true that the finer particle size of the precipitate produced by my process is associated with a change in the structure of the precipitated particles which is highly advantageous and the nature of which I have explained in a later part of my specification.

While my invention may be practiced by a method in which the solution under treatment is admitted and held in the container as a batch, the container being alternately filled and emptied, I have found that it is decidedly advantageous to practice my invention in a container of a length several times that of its diameter to which the alum solution is introduced at one end, heated during its passage through the container to the desired degree and then the produced mother liquor containing the basic alum precipitate in suspension delivered from the other end of the container. In the practice of my invention in this way it is highly desirable and indeed very important that the steam should be admitted into contact with the flowing solution at different points along the length of the container, preferably two or more steam inlets being provided entering the flowing stream at different points in its length. It is preferable to introduce steam to the flowing stream first at some distance from the head of the stream so that the portion of the stream in advance of the steam inlet will be gradually heated with the formation of small crystals of basic alum which, as the heat of the stream is increased as it approaches and passes the steam inlet, will increase in crystal size. It will be understood that the time interval intervening between the preliminary heating, so to speak, of the upper part of the liquid column and its arrival at the zone of maximum heating, is very short so that the exceedingly minute crystals formed in the upper part of the liquid column do not grow, to any objectionable extent, during the period in which the upper part of the liquid column is being heated to the maximum reactive temperature. While it is no doubt true that the individual very small crystals originally formed increase in size by direct increment to the crystal surface, such a growth of the crystal is very much less where the formation and precipitation of the basic alum occurs rapidly, as by my process, than where it occurs more gradually. The particles of the precipitate are, to a large extent, made up of clusters or adherent individual small crystals, the individual crystals making up the cluster composing the particle being comparatively loosely cemented together so that the particles may be said to have a considerable internal surface which is accessible to reagents and no doubt accounts for the higher reactivity exhibited by particles produced by my process as compared with precipitated particles produced by a more gradual heating of the alum solution. If a small particle size is desired, it is advisable that the steam should be admitted closer to the head of the flowing stream, with the result that more crystals of smaller size will be formed. The use of a plurality of spaced steam inlets is important because the reaction by which the basic alum is produced is endothermic and in the described way the necessary high temperature is promptly attained and continued throughout the flowing mass of the solution.

In the operation of the continuous process which I have described as preferable, I have found that where the conduit container, through which the stream of solution is passed, is entirely filled with the solution, stoppages in the continuity of the flow of the solution are apt to occur, which are due, so far as I have been able to ascertain, to the formation of large steam bubbles which do not readily condense. This difficulty I have succeeded in overcoming by maintaining in the upper part of the conduit container, above the level of the contained column or stream of solution, a body of an inert gas, preferably air, the presence of which effectually prevents the stoppages which I have indicated as occurring where no such gas body is maintained in the apparatus.

In the drawing forming part of this specification I have illustrated an apparatus adapted for the practice of my invention in what I believe to be its most efficient manner in which Figure 1 is a central longitudinal section through the container along a plane in which lie the nozzles from which steam is admitted, and Figure 2 is a cross section on the line 2—2 of Figure 1.

A indicates the outer shell of the container or autoclave, which is preferably made of steel and of sufficient strength to sustain the pressure to which it is subjected. $A^1$ indicates the upper head of the autoclave and $A^2$ the lower head or end. B indicates the lining of non-reactive metal, preferably lead, and C the inner lining of non-reactive, inert refractory material, such as acid-proof tiles. D indicates the inlet conduit through which the alum solution is continuously forced into the autoclave under a pressure somewhat exceeding that existing in the autoclave, $D^1$ indicating a pump for forcing the solution into the container and $D^2$ a valve for regulating the flow of solution to the container. E indicates an outlet conduit leading from the bottom of the autoclave and F a valve for regulating the orifice through which the liquid is delivered from the conduit container. G indicates a container into which the solution and the precipitate formed therefrom flows from the exit orifice of the autoclave and from which steam is permitted to escape under preferably regulated conditions, with the effect of rapidly reducing the temperature of the solution.

H indicates a steam header connected with a source of steam under a pressure exceeding that existing in the autoclave and $H^1$, $H^2$, $H^3$, $H^4$, indicate branch pipes leading from the header and preferably turned into ring form in the nozzle of the conduit container, as indicated at $H^5$. From these rings downwardly extending openings are formed, preferably provided with short nozzles, as indicated at $H^6$. Each of the pipes $H^1$, $H^2$, $H^3$, $H^4$, is provided with a regulating valve, as indicated at J and a pressure regulating valve, as indicated at K, is provided in the conduit leading to the header. L indicates a valve at the bottom of the header, provided to permit the escape of water if condensed in the header. M indicates an air compressor, from which a pipe $M^1$ leads into the upper portion of the conduit container. This pipe is provided with a valve, indicated at $M^2$. N indicates the body of liquid maintained in the conduit container and O the body of an inert gas, preferably air, maintained in the upper part of the conduit container. The conduit container illustrated in the drawing is intended to have a height of twenty feet and an internal diameter of four feet.

In starting the apparatus, the outlet valve F is closed, as is also the steam supply. The conduit container is then filled with liquid, preferably with water, up to about the level of the solution inlet D. Air is then forced into the upper part of the container until its pressure reaches a point of one hundred and sixty to one hundred and eighty pounds; steam is then turned on through the pipes H¹, H², H³, H⁴, until the temperature of the liquid contents of the container reaches in its upper level from 130° to 170° C. I then open the delivery valve F and the alum solution feed valve D², the delivery orifice of the valve F being so regulated as, at the pressures existing on the inside of the conduit container, will result in the delivery of liquid from the conduit container at the same rate that the solution is forced into the container, plus the amount of water condensed from the steam used in heating the solution in its passage through the conduit container. The steam supply is regulated to raise and maintain the temperature of the solution passing through the conduit container to the desired degree which, for any practical result, must exceed 140° C. and which, for the best results, should, I have found, be maintained at 185° to 200° C. Working at the temperatures last mentioned, the rate of flow of liquid through the conduit container should be such as to maintain the solution and its products in the container for a period of from eight to ten minutes, at which temperatures a solution of a normal potash alum will precipitate a finely divided precipitate of basic potash alum containing approximately 80% to 85% of the alumina content in the normal alum and about 28% of the potassium sulphate content of the normal alum, the sulphuric acid component of the basic alum will be aproximately 38% of that of the normal alum. The mother liquor will contain in solution the sulphuric acid and potassium sulphate not entering into the composition of the basic alum precipitate, together with the residual amount of normal alum injected during the reaction.

It will be understood that a higher yield of basic alum and a more nearly complete elimination of the alumina content of the normal alum can be obtained by adding to the solution potassium sulphate, preferably to an amount equal to that contained in the normal alum.

It will be understood that my process can be carried on in any conduit container which is acid resisting and it will also be understood that while the continuous process which I have described, has very great advantages, many of the advantages can be availed of in a non-continuous treatment of a normal alum solution to precipitate therefrom a basic alum where the heat is derived from high pressure steam injected into the solution contained in a pressure resisting container.

I would also point out that in my continuous process the injection into the solution passing through the conduit container of steam at different levels or at different points in the path of the solution is highly advantageous as tending to maintain the necessary endothermic heat of reaction throughout the length of the container.

In practice I have found it advantageous to maintain the heat of the upper part of the liquid column at about 130° C. and to so regulate the steam admission that a temperature of approximately 198° C. is attained at approximately two feet below the level of the liquid column. Under these conditions the precipitate will have a particle size such that 99% of it will pass a 300 mesh screen. A more rapid heating of the solution will produce a smaller particle size in the precipitate and a more gradual heating will result in the formation of a larger particle size in the precipitate. What I have said as to particle size and temperatures, refers particularly to the treatment of potassium and sodium alums; in the case of an ammonium alum the particle size will be larger under the same conditions.

It will be understood that my process depends upon the utilization of the latent heat of the high pressure steam used in heating the alum solution and the quantity of steam at two hundred pounds gauge pressure required to precipitate a pound of alumina from an 80% alum solution at an initial temperature of 100° C., is 4.2 pounds.

Having now described my invention, what I claim as new and desire to secure by Letters Patent, is:

1. The method of manufacturing a precipitated basic alum which consists in treating an enclosed body of a normal alum, consisting of a hydrated double salt of alkali sulphate and/or ammonium sulphate and aluminum sulphate by injecting high pressure steam into said enclosed body of the normal alum in such quantity as to rapidly raise and maintain the temperature of the solution to a point in excess of 140° C. to effect the formation and precipitation of a basic alum, consisting of a hydrated compound of an alkali and/or ammonium sulphate and basic aluminum sulphate.

2. The process of claim 1, in which the quantity and temperature of the high pressure steam admitted is such as to raise and maintain the temperature of the alum solution to between 185° and 200° C.

3. The method of manufacturing basic alum which consists in passing a solution of a normal alum into, through and out of a suitable high pressure conduit container and raising the temperature of the flowing stream passing through the conduit to a temperature in excess of 140° C. by injecting high pressure steam into the flowing stream of solution in order to effect the formation and precipitation of a basic alum precipitate.

4. The method of claim 3, as carried into effect by the introduction of steam to the flowing stream of solution at a plurality of points in the length of the said stream.

5. The method of claim 3, in which the flowing stream of solution is raised and maintained during its passage through the conduit container to a temperature between 185° and 200° C.

6. The method of claim 3, in which a body of inert gas is maintained in the upper part of the conduit container in contact with the top of the liquid stream passing through the conduit container.

KATHERINE STEUART.
*Administratrix of the Estate of Gordon R. Steuart, Deceased.*